United States Patent
Japp

[11] Patent Number: 5,833,136
[45] Date of Patent: Nov. 10, 1998

[54] STUDDED TRACTION ASSIST STRIP

[76] Inventor: Philip R. Japp, 46 Lawlor Avenue, Toronto, Ontario, Canada, M4E 3L7

[21] Appl. No.: 672,258

[22] Filed: Jun. 26, 1996

[51] Int. Cl.⁶ .................................................. E01B 23/00
[52] U.S. Cl. .............................................................. 238/14
[58] Field of Search ............................... 238/14; 152/208

[56] References Cited

U.S. PATENT DOCUMENTS

| | | | |
|---|---|---|---|
| 1,375,666 | 4/1921 | Bauer | 238/14 |
| 3,008,643 | 11/1961 | Tanner . | |
| 3,640,459 | 2/1972 | Preisler | 238/14 |
| 3,672,422 | 6/1972 | Greipel | 238/14 |
| 3,749,309 | 7/1973 | Becker | 238/14 |
| 3,797,549 | 3/1974 | Lieberum . | |
| 3,836,075 | 9/1974 | Botbol | 238/14 |
| 3,861,592 | 1/1975 | Fisher | 238/14 |
| 3,997,110 | 12/1976 | Aumont | 238/14 |
| 4,210,280 | 7/1980 | Reisner | 238/14 |
| 4,211,366 | 7/1980 | Czarnota . | |
| 4,223,835 | 9/1980 | Witt et al. . | |
| 4,662,972 | 5/1987 | Thompson . | |
| 4,826,077 | 5/1989 | Egy . | |

FOREIGN PATENT DOCUMENTS

| | | |
|---|---|---|
| 130674 | 12/1948 | Australia . |
| 59-202910 | 11/1984 | Japan . |
| 2087320 | 5/1982 | United Kingdom . |

*Primary Examiner*—Mark Tuan Le

[57] ABSTRACT

A studded traction assist strip for providing emergency traction in the event of snow or ice conditions resulting in a stuck vehicle. The strip includes a generally flat and thin elongate body formed from a resilient rubber material. The body further includes a road facing surface and a wheel traction surface. The road facing surface including a plurality of metal studs extending therefrom for gripping icy surfaces, and the body further includes a plurality of transverse grooves for gripping when said body is in an extended position and to facilitate forming a compact roll for storage when the traction strip is not in use.

15 Claims, 1 Drawing Sheet

STUDDED TRACTION ASSIST STRIP

FIELD OF THE INVENTION

This invention relates generally to the field of traction assist strips of the type that may be used in icy or snowy conditions to provide extra traction to a vehicle whose wheels are slipping because of ice, snow or the like. In particular, this invention relates to a traction assist strip of the type that may be inserted between a wheel and the surface to provide additional traction.

BACKGROUND OF THE INVENTION

In the northern climates motorists, of both cars and trucks, have to contend with snow and ice conditions. Often, snow and ice will accumulate around a vehicle at a time when the vehicle is stationary. Other times, a vehicle may drive into an unplowed area where the snow or ice is so deep, that the vehicle is required to slow down or stop. Owing to the significant inertia of a car or truck, in the event that it is stopped in snow or ice conditions, it can be difficult to reestablish sufficient traction between the wheels and the road surface to cause the vehicle to again move. This is especially true for vehicles which may stop on inclines, such as for example on a hill or the like. Even very slight grades can become impassable under slippery conditions.

When cars become stuck, it is often necessary to get out of the car and physically push the car through the snow or ice until better traction is available for the drive wheels. In cases where the vehicle operator is alone or not physically strong, there may be no way to cause the vehicle to move. This can create safety problems, because the vehicle operator may then be left exposed to the cold weather without being able to reach the safety of a heated building. Alternatively, in running the vehicle engine there is a risk of being exposed to carbon monoxide poisoning from the engine fumes. Such dangers cause people to avoid traveling in extreme conditions where possible, but it is not always possible. Thus every winter thousands of motorists end up stuck or trapped by snowy conditions.

In the past, various devices have been proposed for avoiding these problems by providing devices intended to improve the traction of the vehicle in snowy or icy conditions. For example, U.K. patent application 2,087,320 in the name of Alvers, which was published May 26, 1992, shows a mat for preventing wheel slip. The mat comprises low-density polythene, and is in the form of a rectangular sheet approximately 0.4" thick, 9" wide and 30" long. Extending adjacent to the side edge margins of the sheet on both sides are longitudinal ribs and transversely extending on both sides of the sheet are transverse ribs. The ribs are approximately 2.5 mm thick and 2.5 mm high.

While providing some assistance, this design is inefficient in that in cold conditions, low-density polythene can also become hard, brittle and even, if cold enough slippery. Further, low widely spaced transverse ribs of the device are not substantial enough, nor effective enough, in providing traction in extremely icy conditions for example.

Other devices have been proposed which are in the form of a rug-type traction mat (U.S. Pat. No. 3,008,643 dated Nov. 14, 1961), a traction strip including a sheet of flexible material and a plurality of equally sized metal channels, (U.S. Pat. No. 4,211,366 dated Jul. 8, 1980), and a traction pad having a rectangular mat portion with one end provided with a wedge shape and having groups of substantially conical shaped projections extending from both sides of the mat, (U.S. Pat. No. 4,223,835 dated Sep. 23, 1980). Each of these prior devices, while addressing some concerns, does not provide a fully adequate solution.

SUMMARY OF THE INVENTION

What is required is a simple, inexpensive traction assist strip which can provide sure traction in even the slipperiest and conditions, including sheer ice. Preferably such a traction assist strip would be easily fabricated, and yet be sturdy enough to withstand difficult cold weather conditions. The traction assist strip should include high frictional coefficient materials, such as rubber, rather than plastic, which will not change in characteristics over the temperature range of most weather. Additionally, the strip should include gripping assistance for the most extreme icy conditions, such as metal studs. As well, the strip should be easily and compactly storable, so that it can be kept at hand in case of an emergency.

According to the present invention there is provided a traction assist strip for providing traction to a vehicle tire, the traction assist strip comprising a generally flat and thin elongate body formed from a resilient rubber material;

said body including a road facing surface and a wheel traction surface, said road facing surface including a plurality of metal studs extending therefrom, for gripping icy surfaces, said body further including a plurality of transverse grooves for improved traction, when said body is in an extended position, and to facilitate forming a compact roll for storage, when said body is not in use.

BRIEF DESCRIPTION OF THE DRAWINGS

Reference will now be made to the attached drawings in which a preferred example of the instant invention is discussed, by way of example only, and in which.

DETAILED DESCRIPTION OF THE PREFERRED EMBODIMENTS

Figure 1:
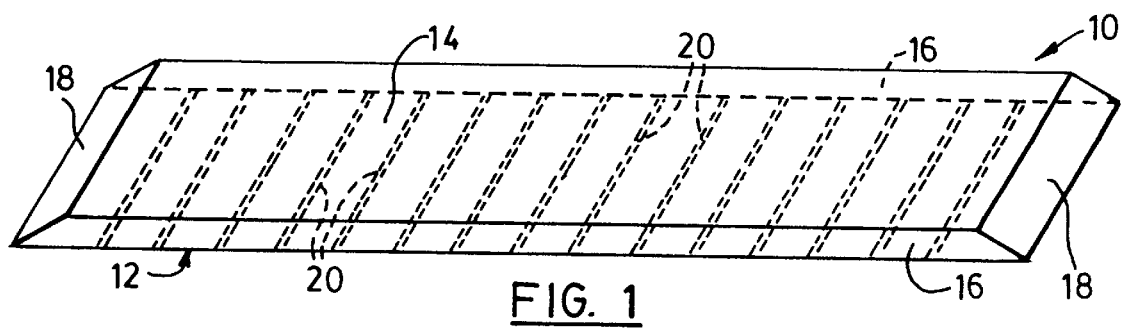
FIG. 1 is an isometric view from above of a traction strip according to the present invention.

FIG. 1 shows a traction assist strip generally identified as 10. The traction assist strip 10 has a road facing surface 12, and an opposite wheel facing surface 14. The traction assist strip 10 is in the form of a body which is generally elongate and thin, having side edges 16 and ends 18 Preferably, the length of the strip when used for passenger automobiles, is 48", the width is approximately 8", and the height is about ¾ of an inch. A larger truck size can also be used which is 48" long and 24" wide as well, to comfortable fit under a the dual wheels of a typical truck. Of course these dimensions are offered as guidance only and particular vehicles having nonstandard dimensions could require other widths of traction assist strip.

Figure 5:
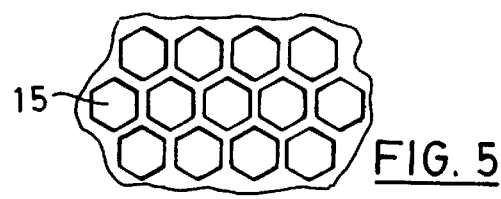
FIG. 5 is a preferred pattern of the top surface of the traction assist strip.

The upper surface 14 is preferably provided with a pattern, for improving traction. The preferred pattern is in the form of hexagonal imprints 15, about 0.25 inches square, which are pressed into, or pressed out of the upper surface 14. An example of such a pattern is shown in FIG. 5. These patterns need not stand very proud of the surface, and may be thought of as merely being dimpling which extends up about 1/32 to 1/16 of an inch.

Figure 2:
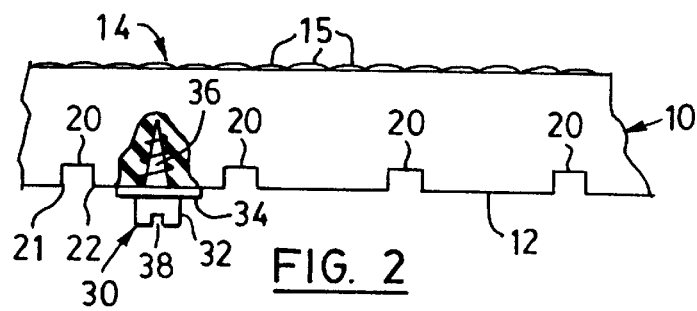
FIG. 2 is an edge view of the traction assist strip of FIG. 1.

Referring to FIG. 2, an edge detail of the traction assist strip 10 is shown. Preferably, the traction assist strip 10 is provided with a plurality of transverse grooves 20, which extend fully from side to side of the strip. The most preferred transverse grooves are 3/16 of an inch wide and 1/8 of an inch deep. Also, it is preferable that the grooves are formed with acute bottom corners, shown at 21 and 22. These bottom corners assist in gripping, and thus sharp 90° corners are preferred to rounded corners.

Also shown in FIG. 2 is a stud 30, of the type that has a protruding metal head 32, a base flange 34, and a pointed threaded root 36. Ideally, the stud is threaded into the body of the device between grooves. It is preferred for each stud 30 to include a keyway, such as slot 38 for facilitating screwing the stud into the body of the traction strip. Additionally, the slots 38 may assist in providing traction in the event the slots 38 are transversely oriented.

Figure 3:
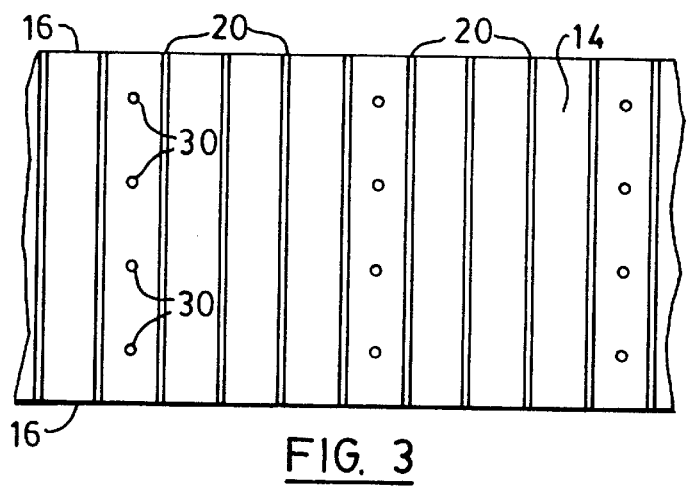
FIG. 3 is a bottom plan view of a portion of the traction assist strip of FIG. 1.

As shown in FIG. 3, a regular pattern of studs can be employed, wherein the studs are placed in transverse rows every 4", with each stud being 2" apart from its neighbor in the row. Also, it is preferable to indent the start of the rows from the side edges of the strip 10, by about 7/8 of an inch. In the most preferred form of the invention there are provided approximately 48 such studs.

Also as can be seen in FIG. 3, a plurality of transverse grooves are formed, ideally about 3/4 of an inch apart. It will be appreciated by those skilled in the art that the precise dimensions given can be varied without departing from the scope of the invention as defined in the attached claims.

Figure 4:
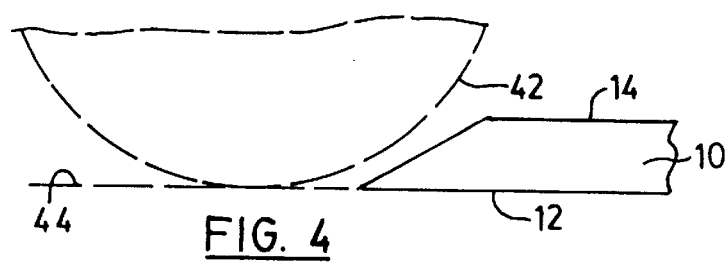
FIG. 4 is an enlarged view of an end detail of the traction assist strip of FIG. 1.

Turning to FIG. 4, an end detail as provided. As can be seen, the ends of the traction strip are preferably beveled as shown at 40, to facilitate inserting the end of the traction strip 40 between a vehicle wheel (shown as 42 in ghost outline) and the ground, shown as 44. While the extent of the bevel could vary, a 45° angle, with a side of approximately 1" long, provides reasonable results. Of course the preferred bevel is one where the thickness tapers to a point at the road facing surface, to form a slight ramp, as shown. A bevel in the opposite direction, which could form a small overhang could also work, but is less preferred.

It can now be appreciated, that the body of the traction strip is most preferably formed from a high-density rubber material. Most preferably, the high-density rubber material has a Shore durmoeter rating of between 65 and 75. It will be appreciated that the body is preferably made from a material that is sufficiently dense and is of a sufficiently integral material that it can adequately grip the threads of the root 36 of the stud 30 under adverse conditions. In other words the studs 30 must be mounted into the road facing surface of the body in such a manner that sufficient shear strength is provided to prevent the studs 30 from ripping out under use in actual conditions. The most preferred form of achieving this is to use the relatively high density rubber noted above which is sufficiently strong and has provided reasonable results. Other alternatives include using reinforcing elements to provide additional strength for materials which have a lower shear strength. It can now be appreciated that plastics which become brittle under cold temperatures are not satisfactory for this purpose.

The preferable material for the body is a form of rubber, with the most preferred form being rubber of the type that is recycled from old automobile and truck tires, and from trim and flashings from other rubber products. This rubber is a high-density material, is very durable and has sufficient shear strength, and has a high frictional coefficient for vehicle tires, even at extreme cold temperatures. Additionally it remains relatively flexible at extremely cold temperatures aiding in the ability of the strip to be placed in position in spite of uneven ground or snow conditions immediately adjacent the tire for which traction is being provided. Additionally, being recycled, it can be obtained at a reasonable cost and prevents waste by way of unnecessary disposal. Thus, recycled rubber is the most preferred material from which to make the traction assist strip of the present invention.

It can further now be appreciated that the transverse grooves provide an additional function to gripping the surface. When the high-density rubber traction pad is to be stored, it is preferred to be rolled into a tight bundle. The strip 10 when made of the preferred thickness and from the preferred rubber according to the present invention is somewhat stiff (although still flexible) and therefore, can be difficult to roll into a tight roll. A tight roll is preferred for storage reasons. The transverse grooves act to increase the bending ability of the traction assist strip (in the manner of hinges living hinges) thereby facilitating the storage of the traction assist strip in a tight roll. By being compact and secure, the traction assist strip can be easily stored in a trunk or the like in a rolled up manner.

It will also be appreciated that the transverse grooves can be formed in the wheel facing surface, in addition to or in substitution for those formed in the road facing surface as shown in the figures. Generally it is preferred to roll the strip with the studs pointing inwardly, because the studs are quite aggressive and if they are left extending out of the roll, they can cause some damage to adjacent equipment. This is especially true if the roll is stored in a trunk or the like and is bounced around during use of the vehicle. Outwardly extending studs would be undesirable for being likely to cause scaring of the adjacent surroundings.

It will be appreciated by those skilled in the art that various modifications and alterations can be made to the invention without departing from the broad scope of the appended claims. For example, while the preferred material is recycled tire rubber, other high-density rubbers may also provide adequate results, if they provide enough strength to grip a threaded stud and have a high enough coefficient of friction to provide the needed traction to vehicle tires.

I claim:

1. A traction assist strip for providing traction to a vehicle tire, said traction assist strip comprising:

a generally flat and thin elongate body formed from a resilient rubber material;

said body including a road facing surface and a wheel traction surface; and said road facing surface including a plurality of metal studs extending therefrom for gripping icy surfaces, said body further including a plurality of transverse grooves for gripping when said body is in an extended position, said studs positioned on said body not in said grooves, the positioning of said studs and the presence of said transverse grooves facilitating forming said body into a compact roll for storage when said body is not in use.

2. The invention of claim 1 further including at least one beveled edge to facilitate inserting the body between a wheel and a surface.

3. The invention of claim 1 wherein said body is formed from high-density rubber.

4. The invention of claim 3 wherein said high-density rubber is recycled rubber.

5. The invention of claim 4 wherein the rubber is made from the rubber having a Shore durometer rating of about 65 to 75.

6. The invention of claim 1 wherein said studs have threaded roots, and said high-density rubber is sufficiently strong to retain said threaded roots in place during use.

7. The invention of claim 1 wherein said threaded studs include a key way on an outer surface to facilitate threading said studs into said body.

8. The invention of claim 1 wherein said threaded studs include a hexagonal head to facilitate threading said studs into said body.

9. The invention of claim 1 wherein said traction assist strip includes a traction enhancing pattern on the road facing surface.

10. The invention of claim 1 wherein said transverse grooves are formed on said road facing surface.

11. The invention of claim 10 wherein said transverse grooves have a depth of between 0.1 and 0.3 of the thickness of the body.

12. The invention of claim 11 wherein said grooves extend fully from one side of the body to the other.

13. The invention of claim 12 wherein said grooves are spaced between 1 and ¾" apart.

14. The invention of claim 1 wherein said traction assist strip is sized for passenger cars and is approximately 48" long and approximately 8" wide.

15. The invention of claim 1 wherein said traction assist strip is sized for dual wheeled trucks and is approximately 48" long and approximately 24" wide.

* * * * *